United States Patent
Rajsic (10) Patent No.: US 9,806,886 B2
(45) Date of Patent: Oct. 31, 2017

(54) SERVICE PLANE ENCRYPTION IN IP/MPLS NETWORKS

(71) Applicant: Carl Rajsic, Ontario (CA)

(72) Inventor: Carl Rajsic, Ontario (CA)

(73) Assignee: Alcatel Lucent, Boulogne-Billancourt (FR)

( * ) Notice: Subject to any disclaimer, the term of this patent is extended or adjusted under 35 U.S.C. 154(b) by 534 days.

(21) Appl. No.: 13/746,119

(22) Filed: Jan. 21, 2013

(65) Prior Publication Data

US 2014/0208099 A1    Jul. 24, 2014

(51) Int. Cl.
| | |
|---|---|
| *H04L 9/00* | (2006.01) |
| *H04L 29/06* | (2006.01) |
| *H04L 9/14* | (2006.01) |
| *H04L 9/08* | (2006.01) |
| *H04L 9/32* | (2006.01) |
| *H04K 1/00* | (2006.01) |

(52) U.S. Cl.
CPC ............ *H04L 9/14* (2013.01); *H04L 63/0435* (2013.01); *H04L 63/0442* (2013.01); *H04L 63/08* (2013.01); *H04L 63/164* (2013.01)

(58) Field of Classification Search
CPC ..... H04L 63/0428; H04L 63/08; H04L 63/06; H04L 29/06; H04L 63/123; H04L 63/029; H04L 9/00; H04L 9/08; H04L 9/32; H04L 29/06068; H04L 29/06095; G06F 21/60; H04K 1/00
USPC .......... 380/255, 277; 709/230; 713/150–151, 713/168; 726/2, 26–27
See application file for complete search history.

(56) References Cited

U.S. PATENT DOCUMENTS

| | | | |
|---|---|---|---|
| 2005/0195813 A1* | 9/2005 | Ambe | ................... H04L 63/101 370/389 |
| 2006/0251101 A1* | 11/2006 | Zhang | ................... H04L 63/029 370/437 |
| 2008/0075073 A1 | 3/2008 | Swartz | |

OTHER PUBLICATIONS

Rosen et al. "Architecture for the Use of PE-PE IPsec Tunnels in BGP/MPLS IP VPNs" Aug. 2005, Internet Engineering Task Force-IETF, pp. 1-8.*

(Continued)

*Primary Examiner* — Tae Kim
*Assistant Examiner* — Shiuh-Huei Ku
(74) *Attorney, Agent, or Firm* — Kramer & Amado, P.C.

(57) ABSTRACT

A method for providing service plane encryption in IP/MPLS and GRE networks is disclosed. The method for providing service plane encryption in IP/MPLS and GRE networks includes receiving a first Security Parameter Index with associated first encryption key and associated first authentication key at a first network element supporting the first Service Distribution Point; receiving an instruction at the first network element to encrypt data entering the first Service Distribution point with the first encryption key; receiving an instruction at the first network element to associate a data communication service provided at the first network element to the first Service Distribution Point; providing an encryption label; and providing data associated with the first communication service to the first Service Distribution Point for transmission to the second Service Distribution Point. The method for providing service plane encryption in IP/MPLS and GRE networks provides encryption advantages over systems known in the art by providing capability for selectively encrypting services connected via a data tunnel.

15 Claims, 5 Drawing Sheets

(56) References Cited

OTHER PUBLICATIONS

Rosen et al. "Architecture for the Use of PE-PE IPsec Tunnels in BGP/MPLS IP VPNs", Aug. 2005, Internet Engineering Task Force-IETF, pp. 1-8.*
Rosen et al. "Multiprotocol Label Switching Architecture", Jan. 2001, The Internet Society (2001), pp. 1-61.*
Alcatel-Lucent 7750 SR OS MPLS Guide Doc No. 93-0075-04-01, Feb. 2008, https://infoproducts.alcatel-lucent.com/cgi-bin/dbacessfilename.cgi/9300750401_V1_7750%20SR%20OS%20MPLS%20Guide%206.0rl.pdf, p. 13.
Alcatel-Lucent Service Router Operating System (SR OS) v 7.0, Security Target Doc No. 1607-00-D000 V1.8 Apr. 6, 2010 (Jun. 4, 2010), http://www.cse-cst.gc.ca/documents/services/cc/alcatel0lucent-v70-sec-eng.pdf, Jun. 4, 2010, pp. 29, 30 and 35.
"IETF Network Working Group, *Opportunistic Encryption in MPLS Networks* (S. Farrell)", Jan. 9, 2014 (Sep. 1, 2004), Ver. 00, http://tools.ietf.org/search/draft-farrell-mpls-opportunistic-encrypt-00, Jan. 9, 2014.
Notification of Transmittal of the International Search Report and The Written Opinion of the International Searching Authority, or the Declaration issued in PCT/CA2014/050030 mailed Mar. 6, 2014.

* cited by examiner

SERVICE PLANE ENCRYPTION IN IP/MPLS NETWORKS

FIELD OF THE INVENTION

The invention relates to the use of encryption of user services data, and in particular to encryption of user data traversing the service plane of IP/MPLS networks.

BACKGROUND OF THE INVENTION

Traditional encryption on the Internet, such as that provided by Internet Protocol Security (IPsec), a protocol suite for securing Internet Protocol (IP) communications by authenticating and encrypting each IP packet of a communication session and which also includes protocols for establishing mutual authentication between agents at the beginning of the session and negotiation of cryptographic keys to be used during the session, is intended for providing users with security for sensitive data and applications. IPsec was designed for authenticating and encrypting IP packets between two routers. IPsec was not designed for networks that carry a mix of IP and MPLS traffic for Layer 2 and Layer 3 services or for network level encryption and security between a multitude of routers communicating together.

The US Congress and Senate are requiring utility companies to expand investment in cyber-security to protect the evolving "Smart Grid". As well, North American Electric Reliability Corporation (NERC) Standards defined national standards for security through NERC-CIP (NERC Critical Infrastructure Protection) requirements, of which encryption/authentication is an important aspect. Likewise, similar requirements are appearing worldwide for corresponding applications, for example, specifications and requirements through the IEC (International Electrotechnical Commission).

Beyond encryption of IP data packets there is a need to effect security on all types of mission critical traffic that may be transported over an IP/MPLS network. Such traffic includes teleprotection Layer 2 circuits for current differential relays in a utility network. Typically, MPLS is used as the key transport technology to enable proper QoS and high availability (e.g. fast re-route, or primary/backup LSPs) for mission critical applications. It also provides enhanced network services by offering one-to-many, many-to-one, or many-to-many type services. An adequate encryption and authentication solution must support the wide variety of traffic and associated services that may exist when using MPLS as the primary transport technology in the IP/MPLS network.

Therefore, it would be useful to have a method which could encrypt any type of MPLS traffic between a multitude of networking devices by selectively encrypting services within MPLS packets end-to-end across an IP/MPLS network.

SUMMARY OF THE INVENTION

It is an object of the invention to provide a method of encrypting and authenticating user data within MPLS packets where user data represents a service associated with the end user.

According to a first aspect of the invention there is provided a method of encrypting and authenticating data between a first Service Distribution Point located at a first network element and a second Service Distribution Point located at a second network element, the first and second Service Distribution Points connected via an MPLS tunnel (e.g. an LSP, E-LSP, LDP LSP, etc.) established by a signaling protocol (e.g. LDP, RSVP, or RSVP-TE), the method having the steps of: receiving a first Security Parameter Index with associated first encryption key and associated first authentication key at a first network element supporting the first Service Distribution Point; receiving an instruction at the first network element to encrypt data entering the first Service Distribution point with the first encryption key; receiving an instruction at the first network element to associate a data communication service provided at the first network element to the first Service Distribution Point; and providing data associated with the first communication service to the first Service Distribution Point for transmission to the second Service Distribution Point.

In some embodiments of this aspect of the invention the tunneling protocol is Multiprotocol Label Switching protocol. In some of these embodiments, the encryption key is associated with one of the encryption algorithms of the group of DES, 3DES, Blowfish, Twofish, Serpent, SNOW 3G, Kasumi-F8, AES-128, AES-192, and AES-256. In others of these embodiments, the authentication key is associated with one of the authentication protocols of the group of AES-XCBC, AES-CBC, Kasumi-F8, SNOW 3G, HMAC-MD5, HMAC-SHA-1, and HMAC-SHA-2 (SHA-224, SHA-256, SHA-384, SHA-512).

In other embodiments of this aspect of the invention the tunneling protocol is Generic Routing Encapsulation protocol. In some of these embodiments, the encryption key is associated with one of the encryption protocols of the group of DES, 3DES, Blowfish, Twofish, Serpent, SNOW 3G, Kasumi-F8, AES-128, AES-192, and AES-256. In others of these embodiments, the authentication key is associated with one of the authentication protocols of the group of AES-XCBC, AES-CBC, Kasumi-F8, SNOW 3G, HMAC-MD5, HMAC-SHA-1, and HMAC-SHA-2 (SHA-224, SHA-256, SHA-384, SHA-512).

According to another aspect of the invention there is provided a non-transitory machine readable storage medium encoded with instructions for execution by a processor at first network element for encrypting data between a first Service Distribution Point located at the first network element and a second Service Distribution Point located at a second network element, the first and second Service Distribution Points connected via a tunneling protocol, the medium having: instructions for receiving a first Security Parameter Index with associated first encryption key and associated first authentication key at a first network element supporting the first Service Distribution Point; instructions for receiving an instruction at the first network element to encrypt data entering the first Service Distribution point with the first encryption key; instructions for receiving an instruction at the first network element to associate a data communication service provided at the first network element to the first Service Distribution Point; instructions for providing an encryption label; and instructions for providing data associated with the first communication service to the first Service Distribution Point for transmission to the second Service Distribution In some embodiments of this aspect of the invention the tunneling protocol is one of the group of Multiprotocol Label Switching protocol and Generic Routing Encapsulation protocol. In some of these embodiments the encryption key is associated with one of the encryption protocols of the group of DES, 3DES, Blowfish, Twofish, Serpent, SNOW 3G, Kasumi-F8, AES-128, AES-192, and AES-256. As well, in some embodiments of this aspect of the invention the authentication key is associated with one of the authentication protocols of the group of AES-XCBC, AES-CBC, Kasumi-F8, SNOW 3G, HMAC-MD5, HMAC-SHA-1, and HMAC-SHA-2 (SHA-224, SHA-256, SHA-384, SHA-512).

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such a feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In general in the description of the figures, like reference numbers are used to represent like elements.

A Virtual Private LAN Service (VPLS) is a Virtual Private Network (VPN) technology that allows multipoint layer 2 connectivity. The provider network emulates a LAN by connecting all the remote customer sites at the edge of the provider network to a single bridged LAN. A full mesh of pseudo-wires (PW) is established to form a VPLS.

A VPLS-capable network consists of Customer Edges (CE), Provider Edges (PE), and a core MPLS network. The CE connects to the PE via Service Access Points (SAP). The PE sets up the VPN and tunnels traffic inside the LSP/PW according to the bindings of the service definition. The MPLS labels are designated via LDP signaling and forwarded into the MPLS uplink (network interface) towards the core. The IP/MPLS core network interconnects the PEs but does not participate in the VPN functionality. Traffic is simply switched based on the MPLS labels.

Service Manager

A Service Manager implementation of VPLS makes use of a service-based architecture that provides the following logical entities that are required to provision a service:

Customers (Subscribers).

An account is created for each customer and assigned an ID. The customer ID is required and associated with the service at the time the service is created.

Service Access Points (SAPs).

Each subscriber service type is configured with at least one SAP. A SAP identifies the point at which customer traffic enters the service.

Service Distribution Points (SDPs).

A SDP provides a logical point at which customer traffic is directed from one PE to another PE through a one-way service tunnel.

Figure 1:
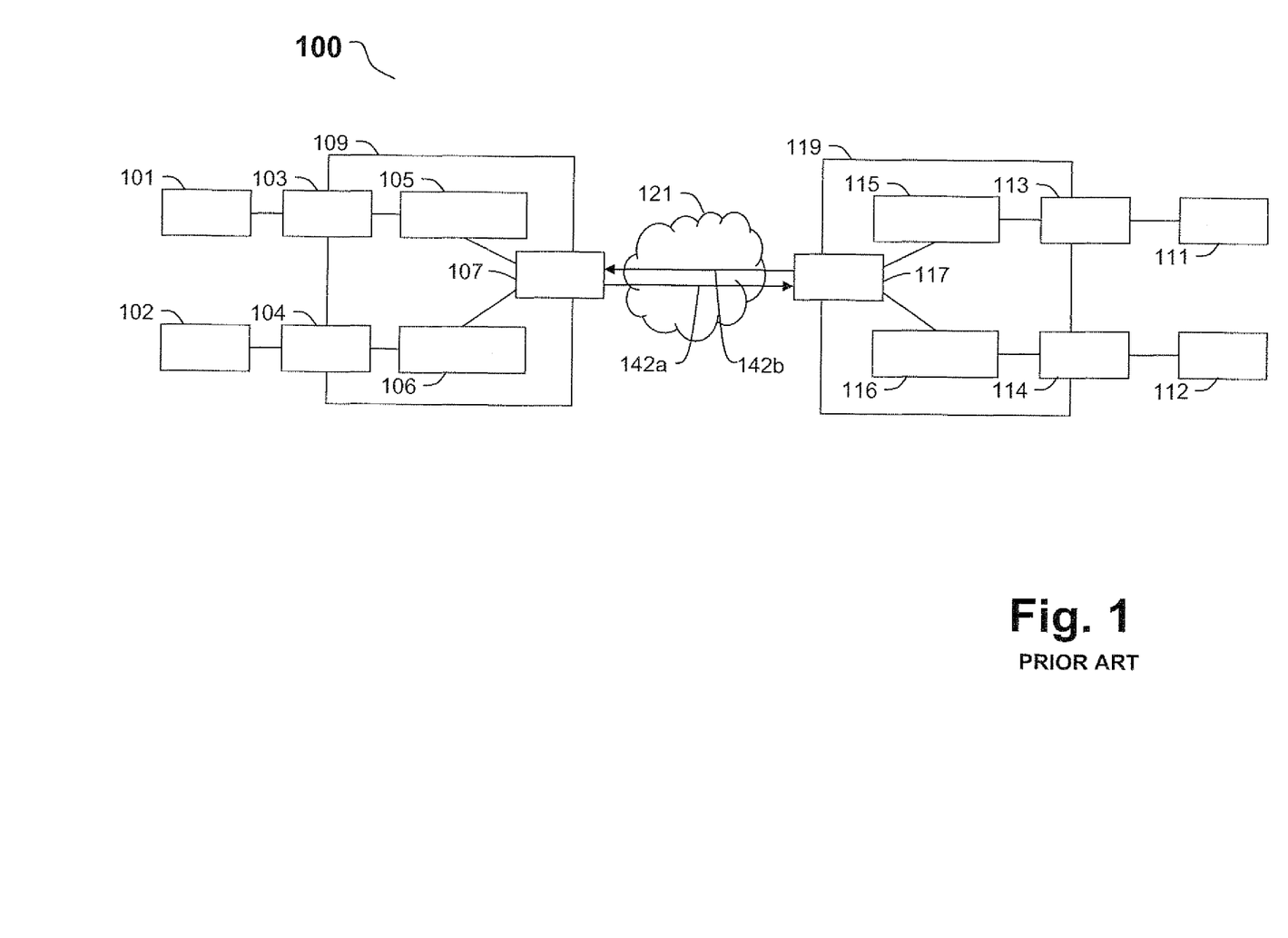
FIG. 1 illustrates an exemplary pair of network edge switches connected through a tunneling protocol according to the prior art.

Referring now to FIG. 1 wherein there may be seen an exemplary network 100 having provider edge network elements 109 and 119. Connected to provider edge network element 109 via Subscriber Access Point 103 is customer equipment 101. Also connected to provider edge network element 109 via Subscriber Access Point 104 is customer equipment 102. Subscriber Access Point 103 is associated with service 105. This service could be, by way of example, a Virtual Leased Line (VLL), a Virtual Private LAN Service (VPLS) or a Virtual Private Routed Network (VPRN). Likewise Subscriber Access Point 104 is associated with service 106.

At the other end of this exemplary network, there may be seen customer equipment 111 connected to provider edge network element 119 via Subscriber Access Point 113. As well there may be seen customer equipment 112 connected to provider edge network element 119 via Subscriber Access Point 114. Subscriber Access Point 113 is associated with service 115 and Subscriber Access Point 114 is associated with service 116.

Connection across core network 121 occurs via data tunnels 142a and 142b. Service Distribution Point 107 is associated with tunnel 142a which terminates on Service Distribution Point 117. Likewise, Service Distribution Point 117 is associated with tunnel 142b which terminates on Service Distribution Point 107.

When service 105 needs to be communicatively connected across the core network 121 to one of the services in provider edge network element 119, an association between service 105 and Service Distribution Point 107 is established. Likewise, when service 106 needs to be communicatively connected across the core network 121 to one of the services in provider edge network element 119, an association between service 106 and Service Distribution Point 107 is established.

Similarly, when service 115 needs to be communicatively connected across the core network 121 to one of the services in provider edge network element 109, an association between service 115 and Service Distribution Point 117 is established. Likewise, when service 116 needs to be communicatively connected across the core network 121 to one of the services in provider edge network element 109, an association between service 116 and Service Distribution Point 117 is established.

The data tunnels 142a and 142b are established with a tunneling protocol, for example Multiprotocol Label Switching (MPLS) protocol, or Generic routing Encapsulation (GRE) protocol. For both MPLS and GRE 142a and 142b are uni-directional, where 142a transmits all services associated with SDP 107 destined for SDP 117 from network element 109 towards 119, and 142b transmits all services associated with SDP 117 destined for SDP 107 from network element 119 towards 109

Figure 2:
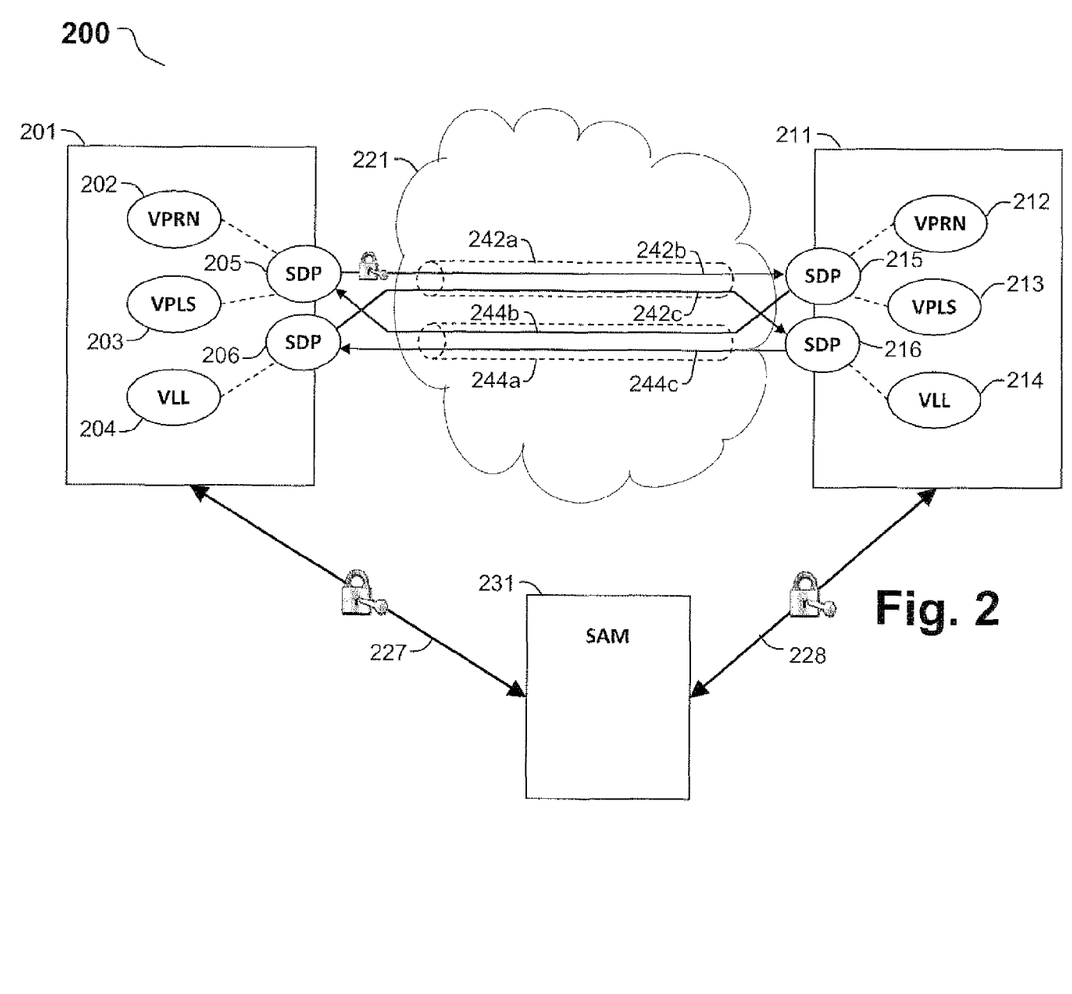
FIG. 2 illustrates an exemplary pair of network edge switches having Service Distribution Points connected through MPLS tunneling protocol according to an embodiment of the invention.

Referring now to FIG. 2, there may be seen an exemplary MPLS network according to an embodiment of the invention. Referring to FIG. 2 there may be seen an exemplary network having provider edge network elements 201 and 211. Network element 201 has a VPRN service 202 associated with Service Distribution Point (SDP) 205. As well, network element 201 has a VPLS service 203 associated with SDP 205. Likewise, network element 211 has a VPRN service 212 associated with SDP 215. As well, network element 211 has a VPLS service 213 associated with SDP 215.

Network element 201 also has a VLL service 204 associated with Service Distribution Point 206. Likewise, network element 211 has a VLL service 214 associated with SDP 216. Examples of this type of service include TDM (CESoPSN, or SAToP), ATM VLL, Frame Relay VLL, IP VLL, Ethernet VLL, Serial DATA VLL, and HDLC VLL services.

The Service Distribution Points are connected across core network 221 via MPLS tunnels 242a and 244a. MPLS tunnel 242a carries data from SDPs 205 and 206 to SDPs 215 and 216 respectively. Likewise, MPLS tunnel 244a carries data from SDPs 215 and 216 to SDPs 205 and 206 respectively.

As may be seen on FIG. 2, MPLS data 242b associated with communications between SDP 205 and SDP 215 within tunnel 242a is encrypted (as indicated by the lock and key symbol) whereas MPLS data 242c between SDP 206 and SDP 216 within tunnel 242a is not encrypted. According to embodiments of the invention, the association of a particular service to a Service Distribution Point having an encrypted tunnel serves to encrypt all communications traversing core network 321 associated with that service. In the case of VLL services 204 and 214, by associating to SDPs 206 and 216 respectively these services are provided with an unencrypted connection across core network 221 through tunnel 242a along the unencrypted tunnel 242c. Therefore, by appropriate association of a particular service to a particular SDP, a choice of encryption or unencrypted communications can be effected. In practice, as described below, the connections although sharing the same MPLS tunnel are differentiated by an encryption label within the packets comprising the communications.

Referring again to FIG. 2, there may be seen Service Aware Manager 231 which is connected to network element 201 by secure communication link 227, and to network element 211 by secure communication link 228 respectively. Communication links 227 and 228 may be effected by any appropriate secure protocol, for example Secure Shell (SSH) protocol. Service Aware Manager 231 provides network elements 201 and 211 the MPLS encryption label used to identify packets that have been encrypted. The encryption label is a network wide label value that is recognized by all nodes to identify encrypted packets on reception and to indicate encryption of MPLS packets on transmissions. It also provides network elements 201 and 211 the necessary encryption and authentication keys required to coordinate encrypted communications between SDPs. The propagation of encryption and authentication keys is described in conjunction with FIG. 6.

Figure 3:
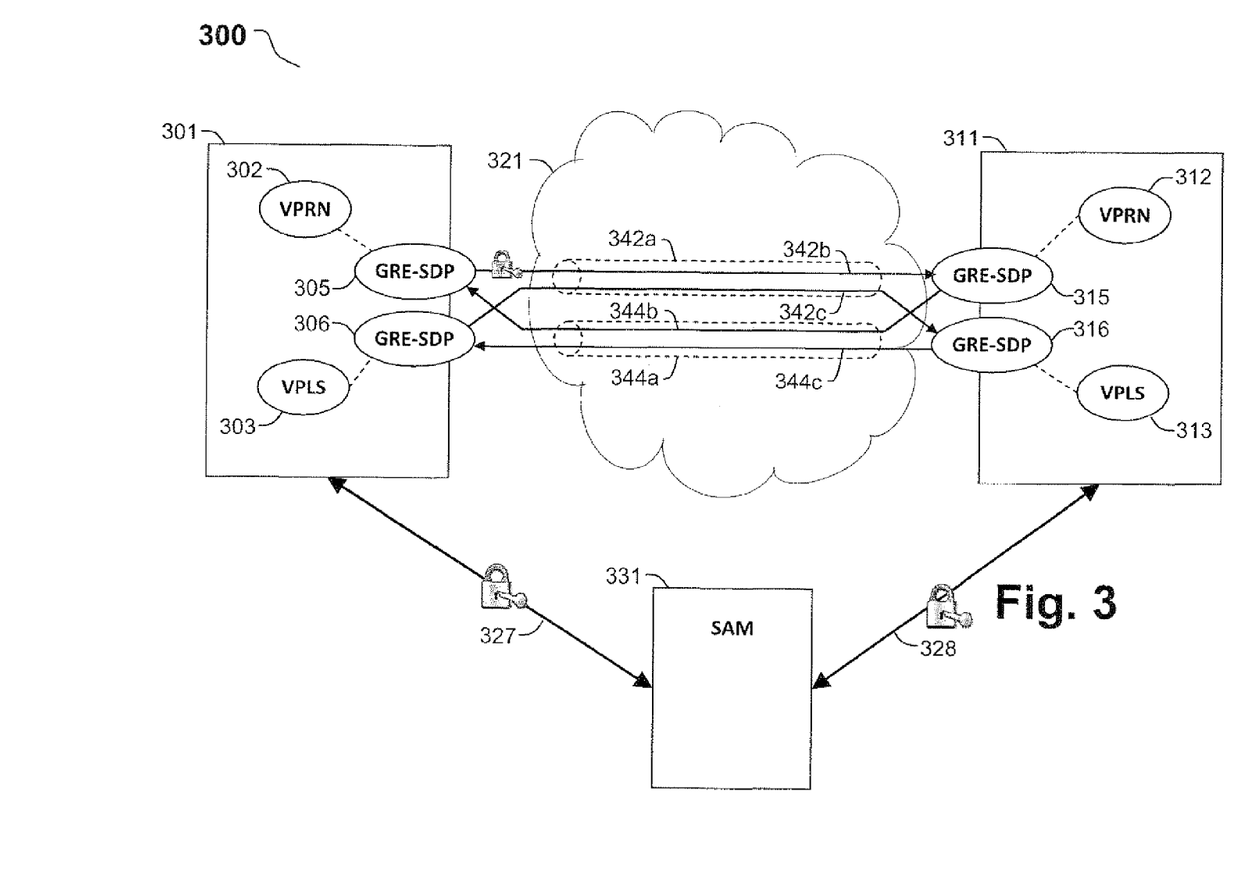
FIG. 3 illustrates an exemplary pair of network edge switches having Service Distribution Points connected through GRE tunneling protocol according to an embodiment of the invention.

Referring now to FIG. 3, there may be seen an exemplary GRE network according to an embodiment of the invention. Referring to FIG. 3 there may be seen an exemplary network having provider edge network elements 301 and 311. Network element 301 has a VPRN service 302 associated with GRE-SDP 305. As well, network element 301 has a VPLS service 303 associated with GRE-SDP 306. Likewise, network element 111 has a VPRN service 312 associated with GRE-SDP 315. As well, network element 311 has a VPLS service 313 associated with GRE-SDP 316.

The GRE-SDPs are connected across core network 321 via GRE tunnels 342a and 344a. GRE tunnel 342a carries data from SDPs 305 and 306 to SDPs 315 and 316 respectively. Likewise, GRE tunnel 344a carries data from SDPs 315 and 316 to SDPs 305 and 306 respectively.

As may be seen on FIG. 3, GRE data 342b associated with communications between SDP 305 and SDP 315 within tunnel 342a is encrypted (as indicated by the lock and key symbol) whereas GRE data 342c between SDP 306 and SDP 316 within tunnel 242a is not encrypted. According to embodiments of the invention, the association of a particular service to a Service Distribution Point having an encrypted tunnel serves to encrypt all communications traversing core network 321 associated with that service. In the case of VPLS services 303 and 313, by associating to SDPs 306 and 316 respectively these services are provided with an unencrypted connection across core network 321 through tunnel 342a along the unencrypted tunnel 342c. Therefore, by appropriate association of a particular service to a particular SDP, a choice of encryption or unencrypted communications can be effected. In practice, as described below, the connections although sharing the same GRE tunnel are differentiated by an encryption label within the packets comprising the communications.

As may be seen on FIG. 3, GRE tunnel 342 is encrypted (as indicated by the lock and key symbol) whereas GRE tunnel 344 is not encrypted According to embodiments of the invention, the association of a particular service to an Service Distribution Point having an encrypted tunnel, serves to encrypt all communications traversing core network 321 associated with that service. In the case of VPLS services 303 and 313, by associating to GRE-SDPs 306 and 316 respectively these services are provided with an unencrypted connection across core network 321 due to the unencrypted GRE tunnel 344. Therefore, by appropriate association of a particular service to a particular SDP, a choice of encryption or unencrypted communications can be effected.

Referring again to FIG. 3, there may be seen Service Aware Manager 331 which is connected to network element 301 by secure communication link 327, and to network element 311 by secure communication link 328 respectively. Communication links 327 and 328 may be effected by any appropriate secure protocol, for example Secure Shell (SSH) protocol. Service Aware Manager 331 provides network elements 301 and 311 the GRE encryption label used to identify packets that have been encrypted. The encryption label is a network wide label value that is recognized by all nodes to identify encrypted packets on reception and to indicate encryption of GRE packets on transmissions. Service Aware Manager 331 also provides network elements 301 and 311 the necessary encryption and authentication keys required to coordinate encrypted communications between GRE-SDPs. The propagation of encryption and authentication keys is described in conjunction with FIG. 6.

Figure 4A:
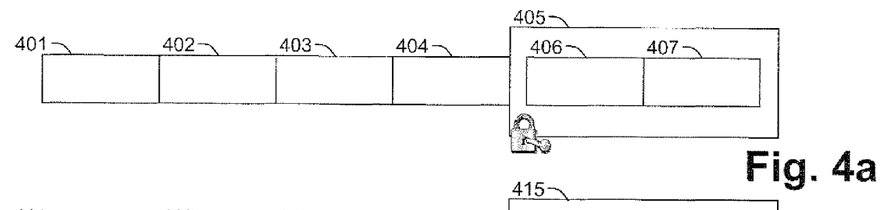
FIG. 4a illustrates an exemplary encrypted packet for a Virtual Private Routed Network according to an embodiment of the invention.

Referring now to FIG. 4a, there may be seen an exemplary encrypted packet for a Virtual Private Routed Network according to an embodiment of the invention intended for use across an MPLS network. Packet segment 401 contains the tunnel label, while packet segment 402 contains the VPRN label. Packet segment 403 contains the encryption label, indicating the packet is encrypted, and packet segment 404 contains the ESP/AH (Encapsulating Security Payload/Authentication Header) data as known in prior art. Packet segment 405 contains the encrypted payload, including IP segment 406 and data segment 407.

Figure 4B:
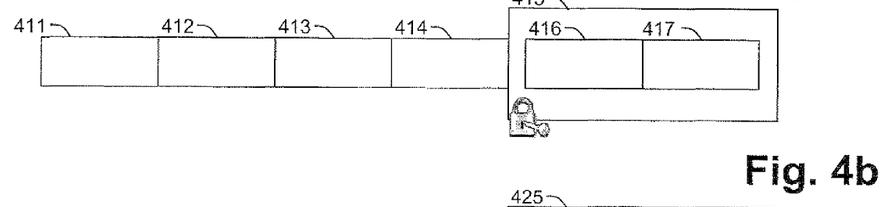
FIG. 4b illustrates an exemplary encrypted packet for a Virtual Private LAN Service according to an embodiment of the invention.

Referring now to FIG. 4b, there may be seen an exemplary encrypted packet for a Virtual Private LAN Service according to an embodiment of the invention intended for use across an MPLS network. Packet segment 411 contains the tunnel label, while packet segment 412 contains the VPLS label. Packet segment 413 contains the encryption label, indicating the packet is encrypted, and packet segment 414 contains the ESP/AH (Encapsulating Security Payload/Authentication Header) data. Packet segment 415 contains the encrypted payload, including Ethernet segment 416 and data segment 417.

Figure 4C:
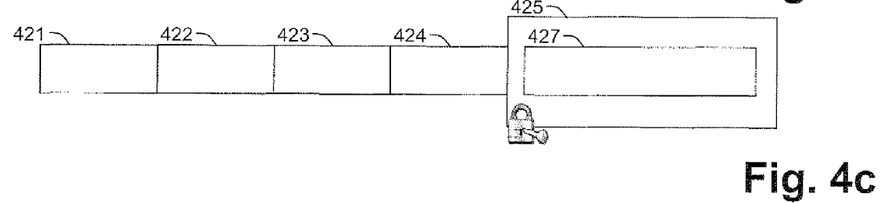
FIG. 4c illustrates an exemplary encrypted packet for a Virtual Leased Line service according to an embodiment of the invention.

Referring now to FIG. 4c, there may be seen an exemplary encrypted packet for a Virtual Leased Line Service according to an embodiment of the invention intended for use across an MPLS network. Packet segment 421 contains the tunnel label, while packet segment 422 contains the VLL label. Packet segment 423 contains the encryption label, indicating the packet is encrypted, and packet segment 424 contains the ESP/AH (Encapsulating Security Payload/Authentication Header) data. Packet segment 425 contains the encrypted payload, including data segment 427.

Figure 5:
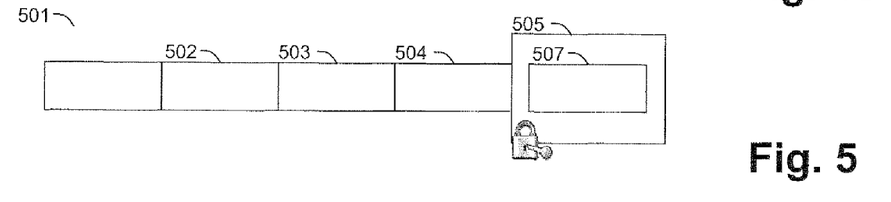
FIG. 5 illustrates an exemplary encrypted packet for a Virtual Private LAN Service routed across a GRE tunnel according to an embodiment of the invention.

Referring now to FIG. 5, there may be seen an exemplary encrypted packet for a Virtual Private Routed Network according to an embodiment of the invention intended for use across a GRE network. Packet segment 501 contains the IP GRE header that includes both the IP Header and GRE header, while packet segment 502 contains the VPRN label. Packet segment 503 contains the encryption label, indicating the packet is encrypted, and packet segment 504 contains the ESP/AH (Encapsulating Security Payload/Authentication Header) data. Packet segment 505 contains the encrypted payload, including data segment 507.

Figure 6:
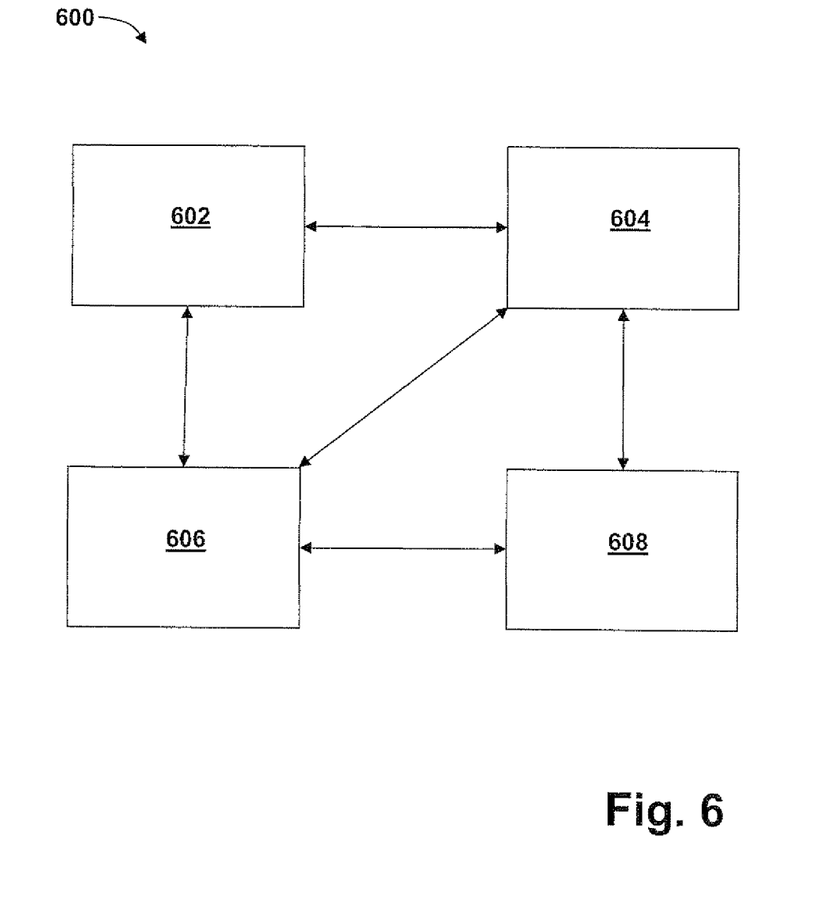
FIG. 6 illustrates a block diagram of a network equipment processor assembly according to an embodiment of the invention.

Referring now to FIG. 6, a network equipment processor assembly 600 which in certain embodiments may be used in the handling of packets, includes a network equipment processor element 606 (e.g., a central processing unit (CPU) and/or other suitable processor(s)), a memory 608 (e.g., random access memory (RAM), read only memory (ROM), and the like), a cooperating module/process 702, and various input/output devices 604 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 602 can be loaded into memory 608 and executed by network equipment processor 606 to implement the functions as discussed herein. As well, cooperating process 602 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

Therefore what has been disclosed is a method for selectively encrypting service plane packets on a per service basis by the association of the service to an encrypted Service Distribution Point.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method of encrypting data between a first Service Distribution Point located at a first network element and a second Service Distribution Point located at a second network element, said first and second Service Distribution Points connected via a tunneling protocol, the method comprising:
   receiving a first Security Parameter Index with an associated first encryption key and an associated first authentication key at the first network element supporting said first Service Distribution Point;
   receiving an instruction at said first network element to encrypt data entering said first Service Distribution point with said first encryption key;
   receiving an instruction at said first network element to associate a data communication service provided at said first network element to said first Service Distribution Point;
   providing an encryption label in a packet having a hierarchy of labels, wherein the encryption label occurs inside both a tunnel label and a service label; and
   providing data associated with said first communication service to said first Service Distribution Point for transmission to said second Service Distribution Point, wherein the encryption label differentiates encrypted communications from unencrypted communications in an identical tunnel.

2. The method as claimed in claim 1, wherein said tunneling protocol is Multiprotocol Label Switching protocol.

3. The method as claimed in claim 2, wherein said encryption key is associated with one of a group of DES, 3DES, Blowfish, Twofish, Serpent, SNOW 3G, Kasumi-F8, AES-128, AES-192, and AES-256.

4. The method as claimed in claim 2, wherein said authentication key is associated with one of the group of AES-XCBC, AES-CBC, Kasumi-F8, SNOW 3G, HMAC-MD5, HMAC-SHA-1, and HMAC-SHA-2 (SHA-224, SHA-256, SHA-384, SHA-512).

5. The method as claimed in claim 1, wherein said tunneling protocol is Generic Routing Encapsulation protocol.

6. The method as claimed in claim 5, wherein said encryption key is associated with one of a group of DES, 3DES, Blowfish, Twofish, Serpent, SNOW 3G, Kasumi-F8, AES-128, AES-192, and AES-256.

7. The method as claimed in claim 5, wherein said authentication key is associated with one of a group of AES-XCBC, AES-CBC, Kasumi-F8, SNOW 3G, HMAC-MD5, HMAC-SHA-1, and HMAC-SHA-2 (SHA-224, SHA-256, SHA-384, SHA-512).

8. A non-transitory machine readable storage medium encoded with instructions for execution by a processor at a first network element for encrypting data between a first Service Distribution Point located at said first network element and a second Service Distribution Point located at a second network element, said first and second Service Distribution Points connected via a tunneling protocol, the non-transitory machine readable storage medium comprising:
   instructions for receiving a first Security Parameter Index with associated first encryption key and associated first authentication key at the first network element supporting said first Service Distribution Point;
   instructions for receiving an instruction at said first network element to encrypt data entering said first Service Distribution point with said first encryption key;
   instructions for receiving an instruction at said first network element to associate a data communication service provided at said first network element to said first Service Distribution Point;
   instructions for providing an encryption label in a packet having a hierarchy of labels, wherein the encryption label occurs inside both a tunnel label and a service label; and
   instructions for providing data associated with said first communication service to said first Service Distribution Point for transmission to said second Service Distribution Point, wherein the encryption label differentiates encrypted communications from unencrypted communications in an identical tunnel.

9. The non-transitory machine readable storage medium as claimed in claim 8, wherein said tunneling protocol is one of the group of Multiprotocol Label Switching protocol and Generic Routing Encapsulation protocol.

10. The non-transitory machine readable storage medium as claimed in claim 8, wherein the authentication key is associated with one of a group of DES, 3DES, Blowfish, Twofish, Serpent, SNOW 3G, Kasumi-F8, AES-128, AES-192, and AES-256.

11. The non-transitory machine readable storage medium as claimed in claim 8, wherein said authentication key is associated with one of a group of AES-XCBC, AES-CBC, Kasumi-F8, SNOW 3G, HMAC-MD5, HMAC-SHA-1, and HMAC-SHA-2 (SHA-224, SHA-256, SHA-384, SHA-512).

12. The method of claim 1, wherein the identical tunnel is a Multi-Protocol Label Switching (MPLS) tunnel.

13. The method of claim 1, wherein the identical tunnel is a Generic Routing Encapsulation (GRE) tunnel.

14. The non-transitory machine readable storage medium of claim 8, wherein the identical tunnel is a Multi-Protocol Label Switching (MPLS) tunnel.

15. The non-transitory machine readable storage medium of claim 8, wherein the identical tunnel is a Generic Routing Encapsulation (GRE) tunnel.

* * * * *